US 11,183,211 B1

United States Patent
Gambhir et al.

(10) Patent No.: US 11,183,211 B1
(45) Date of Patent: Nov. 23, 2021

(54) DIGITALLY ASSISTED ULTRA-FAST BANDWIDTH CALIBRATION OF A PROGRAMMABLE ANALOG FILTER

(71) Applicant: Marvell Asia Pte, Ltd., Singapore (SG)

(72) Inventors: Manisha Gambhir, Cupertino, CA (US); Ahmed Mostafa, San Jose, CA (US); Zubir Adal, Cupertino, CA (US); Jingren Gu, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/932,504

(22) Filed: Jul. 17, 2020

Related U.S. Application Data (60) Provisional application No. 62/875,419, filed on Jul. 17, 2019.

(51) Int. Cl.
*G11B 5/09* (2006.01)
*G11B 5/596* (2006.01)
*G06F 1/03* (2006.01)

(52) U.S. Cl.
CPC .......... *G11B 5/59622* (2013.01); *G06F 1/03* (2013.01); *G11B 5/59633* (2013.01)

(58) Field of Classification Search
None
See application file for complete search history.

(56) References Cited

U.S. PATENT DOCUMENTS

| | | | |
|---|---|---|---|
| 5,726,821 A * | 3/1998 | Cloke ............... | G11B 5/012 360/25 |
| 5,861,766 A * | 1/1999 | Baumer ............ | H03L 7/1072 327/105 |
| 6,262,857 B1 * | 7/2001 | Hull ................. | G11B 20/10009 360/46 |
| 6,278,565 B1 * | 8/2001 | Yoon ................ | G11B 7/005 360/46 |
| 6,337,778 B1 * | 1/2002 | Gagne .............. | G11B 20/1426 360/46 |
| 6,441,981 B1 * | 8/2002 | Cloke .............. | G11B 20/10009 360/48 |

* cited by examiner

*Primary Examiner* — Peter Vincent Agustin (57) ABSTRACT

Systems and methods for improving seek times in a read channel performing a read operation on a disk drive are disclosed. The method includes extrapolating, based on initial filter settings corresponding to a first user-data region or a first servo-data region and tracked settings varying over time, a proportionality constant for the programmable analog filter, in response to determining a new target frequency for the programmable analog filter corresponding to a second user-data region or a second servo-data region, computing new filter settings for the programmable analog filter based on the extrapolated proportionality constant, and transmitting, to the programmable analog filter, the computed new filter settings corresponding to the new target frequency of the second user-data region or the second servo-data region.

20 Claims, 6 Drawing Sheets

Gmeff Weight $_{GM\text{-}code, DAC\text{-}code}$  Mapping = (GM control-weight)*(DAC control weight)

| | GM Code=1 | GM Code=2 | GM Code=3 | GM Code=4 | ... | GM Code=13 | GM Code=14 | GM Code=15 |
|---|---|---|---|---|---|---|---|---|
| DAC Code 0 | 1*1 | | 3*1 | 1*1 | ... | | | 11*1 |
| DAC Code 1 | 1*1.09 | 3*1.09 | 1*1.09 | | ... | | | 11*1.09 |
| DAC Code 2 | 1*1.19 | 3*1.19 | 1*1.19 | | ... | | | 11*1.19 |
| DAC Code 3 | 1*1.29 | 3*1.29 | 1*1.29 | | ... | | | 11*1.29 |
| --- | | | | | ... | | | |
| DAC Code 48 | | | | | ... | | | |
| --- | | | | | ... | | | |
| DAC Code 63 | 1*1.3 | 3*1.3 | 1*1.3 | | ... | | | 11*1.3 |

DIGITALLY ASSISTED ULTRA-FAST BANDWIDTH CALIBRATION OF A PROGRAMMABLE ANALOG FILTER

CROSS REFERENCE TO RELATED APPLICATION

This disclosure claims the benefit of commonly-assigned U.S. Provisional Patent Application No. 62/875,419, filed Jul. 17, 2019, which is hereby incorporated by reference herein in its entirety.

FIELD OF USE

This disclosure generally relates to the calibration of programmable analog filters that may be suitable for self-servo-write operations in storage devices such as disk drives. More particularly, this disclosure relates to systems and methods for improving seek times in operation of disk drives.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Analog filters are commonly used in front-end devices to shape and optimize dynamic range of analog signals before its digitization. A typical filter may consist of multiple stages of filtering and built in equalization. Often such filters are reconfigurable and adaptable in terms of the shape of transfer function, pole-zero location, equalization type, and bandwidth to adapt to change of operation, data rate, usage and application.

Specifically, for disk drive applications, storage media may consist of a continuum of 'data sectors' (where user data is written to and read from) which are interspersed with 'servo sectors' (used to identify position on magnetic disc). Servo sectors may be written with a tonal signature of a certain frequency, while a data sector may be written with highly overlapping pulses with a broadband content. Thus, the filter's operating frequency continuously shifts between data and servo wedges. In an embodiment, the filter's operating frequency also shifts between different data sectors (during a read operation) and servo zones (during a write operation) of the Hard-Disk Drive.

To be able to dynamically and accurately change channel/filter bandwidth between data and servo, analog filters require closed-loop and continuous bandwidth calibration, which tracks voltage variations as well as temperature supply variations. Typical solutions of calibrating an analog filter's bandwidth consist of 'sensing' analog-time-constant and building a control loop around it to fix it to a 'golden-time-reference'. For instance, in some conventional techniques, an analog filter's bandwidth (analog-time-constant) is fixed to a given percentage of PLL frequency (golden-time-reference).

However, such closed-loop calibration of filter bandwidth is typically a very slow process and can take hundreds of micro-seconds to converge. In contrast, length of the servo gate in a read channel may only span 5-10 μs. This extensive time for calibration means that the read channel cannot be set immediately and also needs redundant and independent calibration of data and servo. This directly impacts the format efficiency and results in missed servo or data wedges and necessitates that head to go over the disk-track multiple times.

Although the description above discusses the advantages of ultra-fast settling analog filters in the context of a disk drive application, a skilled artisan will understand that the methods and techniques disclosed herein are suitable for additional front-end devices as well as for reception of wireless analog signals (e.g., WiFi, Cellular, etc.). For example, one application of ultra-fast settling programmable analog filters is in Zone Servo which include a few servo zones across the Hard-Disk Drive. The filter needs to be driven rapidly to go from one servo zone to another without having to wait for the replica cell to settle. Moreover, on the servo side, there are now new features such as concentric servo which also need fast settling to reconfigure the programmable analog filter. Similarly, data is often varied from sector to sector as well. Thus, there is a need for ultra-fast settling programmable analog filters on the data side as well.

SUMMARY

According to implementations of the subject matter of this disclosure, a disk drive includes a disk having a disk surface, where the disk surface includes a plurality of tracks arranged in an embedded servo format including a plurality of user-data regions and a plurality of servo data regions, each data region includes a plurality of data zones in each of which user data is stored in a plurality of track segments at a data channel frequency particular to that data zone, and each servo region includes a plurality of servo zones in each of which servo data are stored in a plurality of track segments at a servo channel frequency particular to that servo zone and different from the data channel frequency. The disk device also includes a read channel for performing a user-data read operation for reading data from the disk surface. The read channel includes a digital processor configured to extrapolate, based on initial filter settings corresponding to a first user-data region or a first servo-data region and tracked settings varying over time, a proportionality constant for the programmable analog filter, in response to determining a new target frequency for the programmable analog filter corresponding to a second user-data region or a second servo-data region, compute new filter settings for the programmable analog filter based on the extrapolated proportionality constant, and transmit, to the programmable analog filter, the computed new filter settings corresponding to the new target frequency of the second user-data region or the second servo-data region.

In a first implementation of such a method, the digital processor is configured to extrapolate the proportionality constant for the programmable analog filter by performing a background calibration operation to determine the initial filter settings for the programmable analog filter corresponding to the first user-data region or the first servo-data region, and determining a ratio between a transconductance value generated based on the determined initial filter settings and initial target bandwidth corresponding to the first user-data region or the first servo-data region, wherein the ratio is constant over temperature and voltage variance.

In a first instance of that first implementation, estimating the proportionality constant based on the initial target bandwidth and the corresponding normalized transconductance value includes determining an element control word corresponding to the initial target bandwidth, computing an initial transconductance value corresponding to the determined element control word, and estimating the proportionality constant based on the computed initial transconductance value.

That first instance of that first implementation may include computing the initial transconductance value by searching a weight-lookup table to identify an initial fine-tuning control value and an initial coarse control value corresponding to the determined element control word.

A second instance of the first implementation may further include determining new filter settings for the programmable analog filter based on the extrapolated proportionality constant by computing a desired bandwidth based on a new target phase-locked loop frequency and a new frequency control word, computing a new transconductance value based on the estimated proportionality constant and the computed desired bandwidth, and determining the new filter settings for the programmable analog filter based on the computed new transconductance value.

The second instance of the first implementation may further include computing the desired bandwidth in accordance with:

$$\text{Desired Bandwidth}=FCW\_new*PLL\_Frequence\_new$$

wherein FCW_new is the new frequency control word and PLL_Frequency_new is the new target phase-locked loop frequency.

The second instance of the first implementation may further include determining the fine-tuning control value and the coarse control value for the programmable analog filter based on the computed new normalized transconductance value by searching a weight-lookup table to identify the new filter settings corresponding to the computed new transconductance value, wherein the filter settings include a fine-tuning control value and a coarse control value.

In an embodiment, the weight-lookup table is pre-computed based on a nominal characteristic curve of a plurality of transconductor elements and Digital-to-Analog Converter (DAC) codes.

In one instance of the first implementation, the fine-tuning control value corresponds to a biasing voltage applied to the programmable analog filter.

In yet another instance of the first implementation, the coarse control value corresponds to a number of unit elements connected in parallel within the programmable analog filter.

According to implementations of the subject matter of this disclosure, a method for improving seek times in a read channel performing a read operation on a disk drive is disclosed. The method includes extrapolating, based on initial filter settings corresponding to a first user-data region or a first servo-data region and tracked settings varying over time, a proportionality constant for the programmable analog filter, in response to determining a new target frequency for the programmable analog filter corresponding to a second user-data region or a second servo-data region, computing new filter settings for the programmable analog filter based on the extrapolated proportionality constant, and transmitting, to the programmable analog filter, the computed new filter settings corresponding to the new target frequency of the second user-data region or the second servo-data region.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As discussed above, Hard-Disk Drives are often divided into multiple zones, where each of the zones has its own respective writing frequencies. Modern hard drives can have around 15-20 zones therefore requiring multiple calibration operations. Conventional systems requiring full calibration can take 80-100 μs to settle for each zone. A bandwidth calibration system and method in accordance with the present disclosure provides a fast-settling operation which removes latencies associated with waiting for full calibration for each of the zones. Specifically, methods and systems in accordance with the current disclosure can perform the filter's bandwidth calibration in as short a time as ~1 μs.

Similarly, data is often varied when written into different sectors of a Hard-Disk Drive. A read channel device needs to switch to new frequency triggers as it moves from one sector to the next. Conventional systems requiring full calibration have a lot of latency associated with the slow settling operation of the analog filter. In contrast, a computation-based bandwidth calibration system as discussed here in the current disclosure provides a fast-settling programmable analog filter which reduces system delay and increases format efficiency.

As described above, conventional methods require waiting for a full closed-loop calibration of the filter's time constant that searches for the filter's calibrated setting. Specifically, conventional calibration of the filter's bandwidth involves an extensive search on the filter's control setting for which the bandwidth of the filter accurately matches a target bandwidth. Target bandwidth is defined through a Frequency-Control-Word (FCW) in proportion to a golden frequency or time reference, such as a locked Phase-Locked-Loop Frequency (PLL_Frequency). For example, the target frequency is defined as:

$$\text{Target}_{Frequency}=FCW*PLL_{Frequency} \quad (1)$$

where Frequency-Control-Word (FCW) and PLL_frequency could vary significantly between data and servo.

A typical closed-loop bandwidth calibration relies on a master calibration circuit which is a replica of the main filter in terms of time-constant/bandwidth. Calibration logic circuit searches through the filter controls to find the closest match between the time constant of the replica circuit to the inverse of the target bandwidth as defined by Equation (1) above. Convergence of this traditional search is impacted by slow settling of analog components and the vast span of control settings to comb through. Thus, the traditional bandwidth calibration could take 10 μs to 100 μs to converge on a solution. Both the filter and the read channel have to wait before the controls can be updated to reflect the desired bandwidth, thus impacting format efficiency.

In contrast, in accordance with an implementation of the subject matter of this disclosure, a digital computational engine extrapolates and directly finds the new settings for the filter based on a proportionality constant for the analog filter that has been previously derived from a background closed-loop calibration. More specifically, a master replica in background computes a proportionality constant between filter's bandwidth and its control setting. This proportionality constant is computed prior to the time when a new frequency target is desired (e.g., receiving a new frequency target trigger when shifting between data and servo wedges in a disk drive application). Furthermore, the filter's control settings are defined through a weight consisting of appropriate summation of analog components. A map of weights that is indexed by a set of discrete analog controls (coarse and fine) is used for lookup purposes to define weight ratios between the analog components. When a newly desired frequency bandwidth is dialed, a prior estimate of the proportionality coefficient along with the preloaded map of filter weights is used to compute the desired filter weight which corresponds to the desired filter settings. This weight directly yields the computed solution for the filter's calibration as will be described below in greater detail.

The subject matter of this disclosure may be better understood by reference to FIGS. 1-7.

A disk drive includes a disk having a disk surface. The disk surface includes a plurality of tracks arranged in an embedded servo format including a plurality of user-data regions and a plurality of servo data regions. In an embodiment, each data region includes a plurality of data zones in each of which user data is stored in a plurality of track segments at a data channel frequency particular to that data zone. Similarly, each servo region includes a plurality of servo zones in each of which servo data are stored in a plurality of track segments at a servo channel frequency particular to that servo zone and different from the data channel frequency. Moreover, the disk drive includes a read channel for performing a user-data read operation for reading data from the disk surface. The structure and operation of the read channel is described in greater detail below in connection with FIG. 1.

Figure 1:
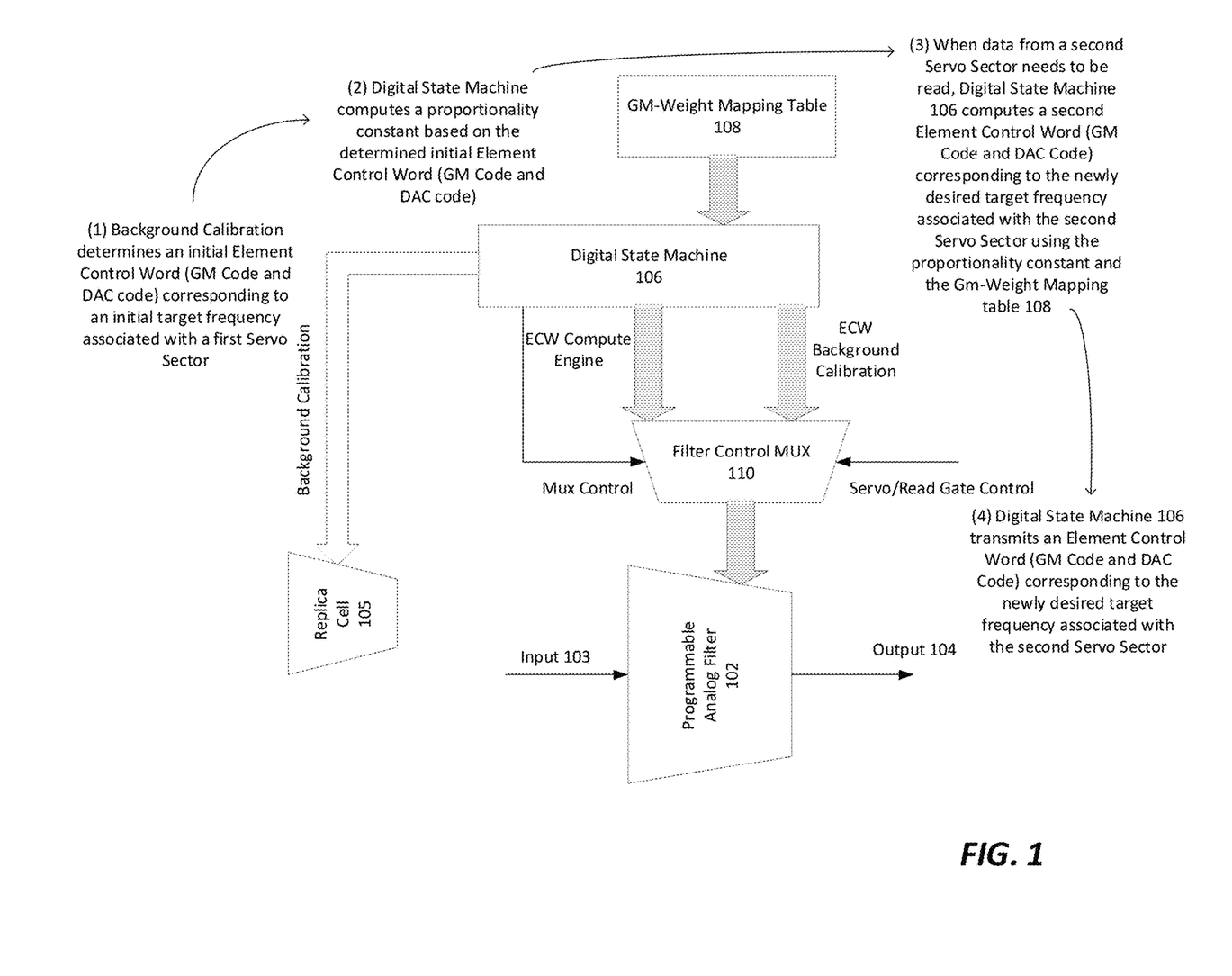
FIG. 1 shows an example of a system architecture for the improved bandwidth calibration methods in accordance with subject matter of the present disclosure.
Figure 2:
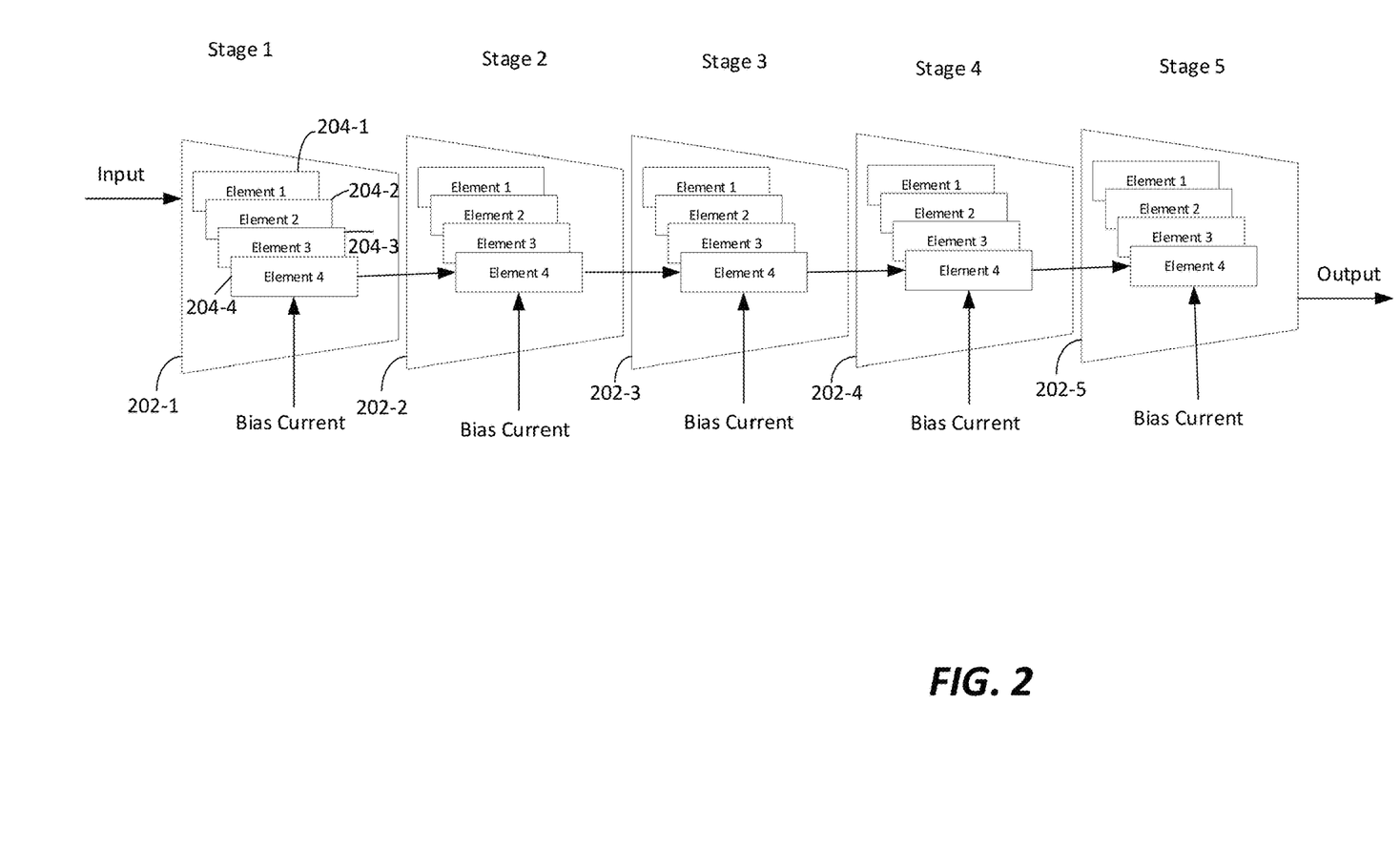
FIG. 2 is a diagram of an N-stage analog filter as in FIG. 1 in implementations of the subject matter of this disclosure.

FIG. 1 shows an example system architecture for the improved bandwidth calibration methods in accordance with subject matter of the present disclosure. The system includes a programmable analog filter 102 having an input 103 and an output 104, a replica cell 105, and a digital state machine 106. Analog filter 102 (as shown in FIG. 2 in greater detail) is a multi-stage filter designed to provide 5th order filtering and frequency selective shaping. The filtering function is achieved by combining a lossy element (e.g., transconductor or resistors) with capacitive impedances to yield appropriate shaping over a frequency band, in accordance with an embodiment of this disclosure.

Figure 3:
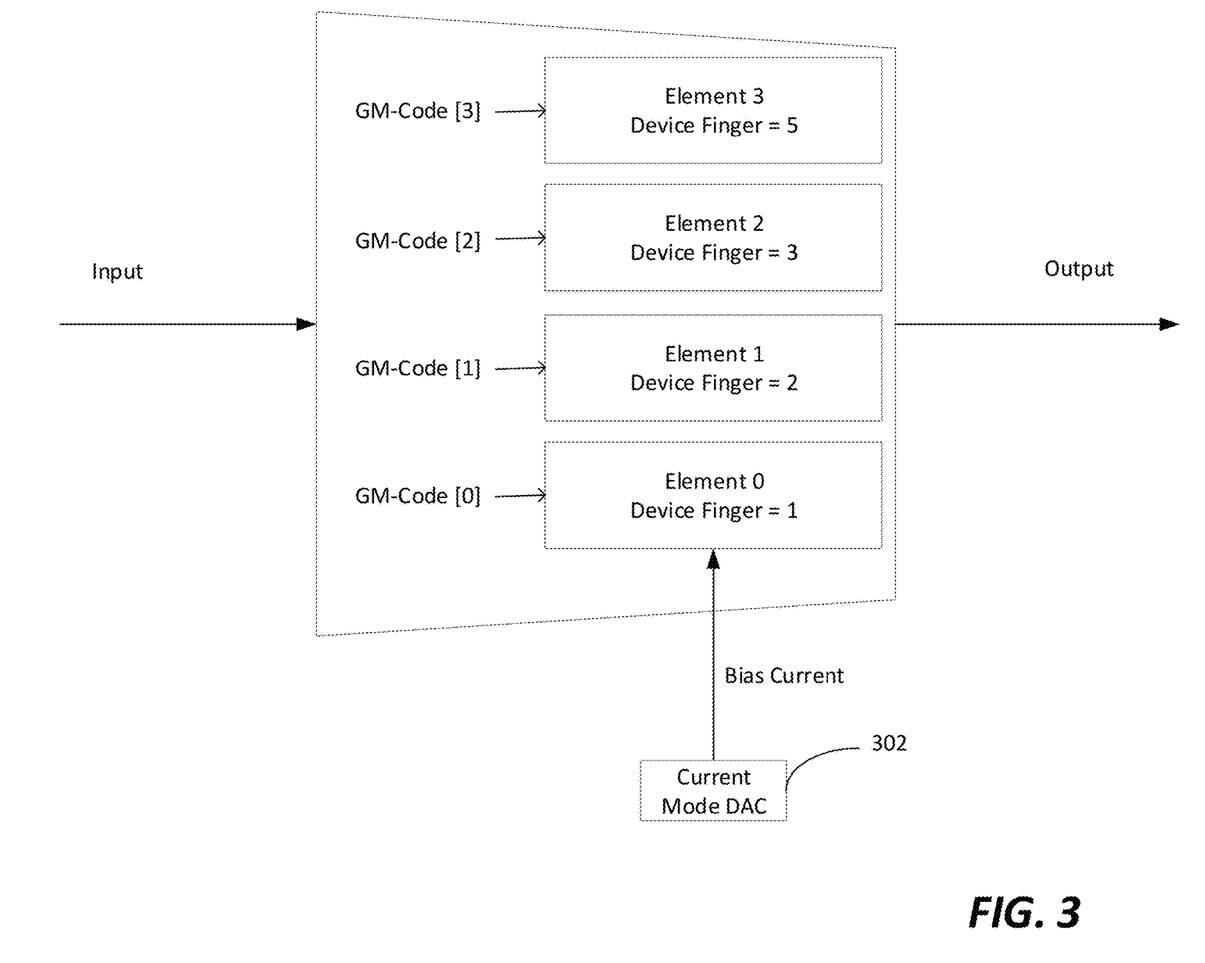
FIG. 3 is a diagram of a stage of the N-stage analog filter as in FIG. 2 in accordance with implementations of the subject matter of this disclosure.

Tuning of the filter over a wide bandwidth is achieved by controlling elements 204-1, 204-2, 204-3, 204-4 (collectively 204) of each stage 202-1, 202-2, 202-3, 202-4, 202-5 (collectively 202) of the filter via a combination of coarse control and fine control. Coarse control (e.g., GM-codes [0:3]) controls number or multiplicity of unit filtering elements to be put in parallel (for example, MOS-resistors, transconductors, and capacitors). Fine control controls the bias voltage associated with the filter elements (bias of the transconductors or the MOS-resistor could be controlled through a Current Mode DAC 302).

As discussed above, appropriate selection of coarse and fine control for filter elements set the frequency of analog filter 102 close to the desired frequency. Each unique combination of control elements (coarse and fine) is expressed as Element Control Word (ECW). The required Element Control Word (ECW) to set the bandwidth of the analog filter varies from part to part, over process, and even drifts over time and temperature. Hence, conventional methods require a closed-loop calibration engine to appropriately find and then track this value.

Digital state machine 106 contains operational and logical functions that control the replica cell 105 that runs in background, intakes information regarding newly desired filter bandwidth, computes the transconductance weight that would be required to achieve the desired filter bandwidth, indexes this computed transconductance weight with regards to filter elements, and finally applies an ECW (filter control) to analog filter 102 to appropriately set its frequency. More specifically, following the first frequency trigger after power-on, the background calibration engine finds an appropriate Element Control Word (ECW) (coarse and fine control of filter) corresponding to the initial bandwidth target. Next, the digital state machine 106 computes a proportionality constant based on the initial bandwidth target and the ECW corresponding to the initial bandwidth target. Once a new frequency target is dialed (e.g., the dialed data or servo mode PLL frequency), digital state machine 106 computes the newly desired filter bandwidth using Equation (4) discussed below. Next, the digital state machine 106 determines the ECW corresponding to the newly desired bandwidth target based on the proportionality constant and the newly desired filter bandwidth. Additional details about the operation of the digital state machine 106 is discussed below in greater detail in connection with FIG. 7. This entire computation and estimation process takes approximately 1 μs.

A background replica-GM based master calibration loop runs in the background using replica cell 105. This calibration loop estimates the analog filter's proportionality constant and compares it to the reference set through a golden time reference (PLL_frequency) and the FCW (Frequency Control Word). Subsequently, the ECW (Element Control Word) is varied to achieve the state where the filter's bandwidth is same as the dialed bandwidth set by the FCW. This background calibration loop is slow, runs in background, can run at an arbitrary bandwidth target, and does not need to be synced to the main path filter where a certain bandwidth target is desired.

Purpose of this background calibration loop is to establish the proportionality between a certain bandwidth and Element control word and have this proportionality constant estimated while tracking its drifts over temperature and time. More specifically, once the background calibration loop finds an appropriate Element Control Word (ECW) (coarse and fine control of filter) corresponding to the initial bandwidth target after power-on, the effective weight of analog components (gm_eff) as indexed by filter's discrete control ECW (both coarse and fine control) is mapped against the target bandwidth and a slope of the resulting curve is calculated. This computed slope is the proportionality constant which establishes the proportionality between a certain bandwidth and Element control word.

Figure 5:
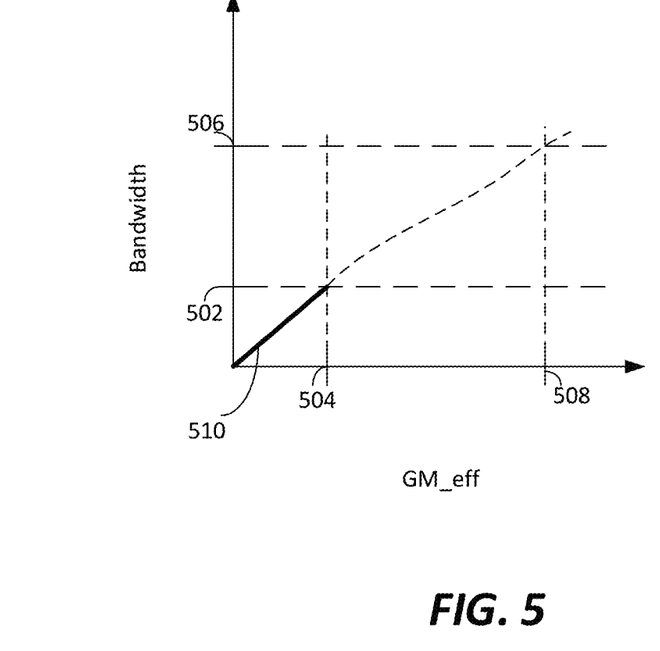
FIG. 5 is a diagram showing the graphical relationship between a dialed bandwidth and a normalized transconductance.

As illustrated in FIG. 5, the initial target bandwidth 502 is mapped against the computed effective weight of analog components (gm_eff) 504 and a slope 510 is calculated. As will be discussed in the greater detail below, once a new target bandwidth 506 is dialed, the calculated slope 510 is used to extrapolate a corresponding new effective weight of analog components (gm_eff) 508. Once the new effective weight of analog components (gm_eff) 508 is determined, digital state machine 106 performs a lookup operation using the GM-weight mapping table 108.

Figure 6:
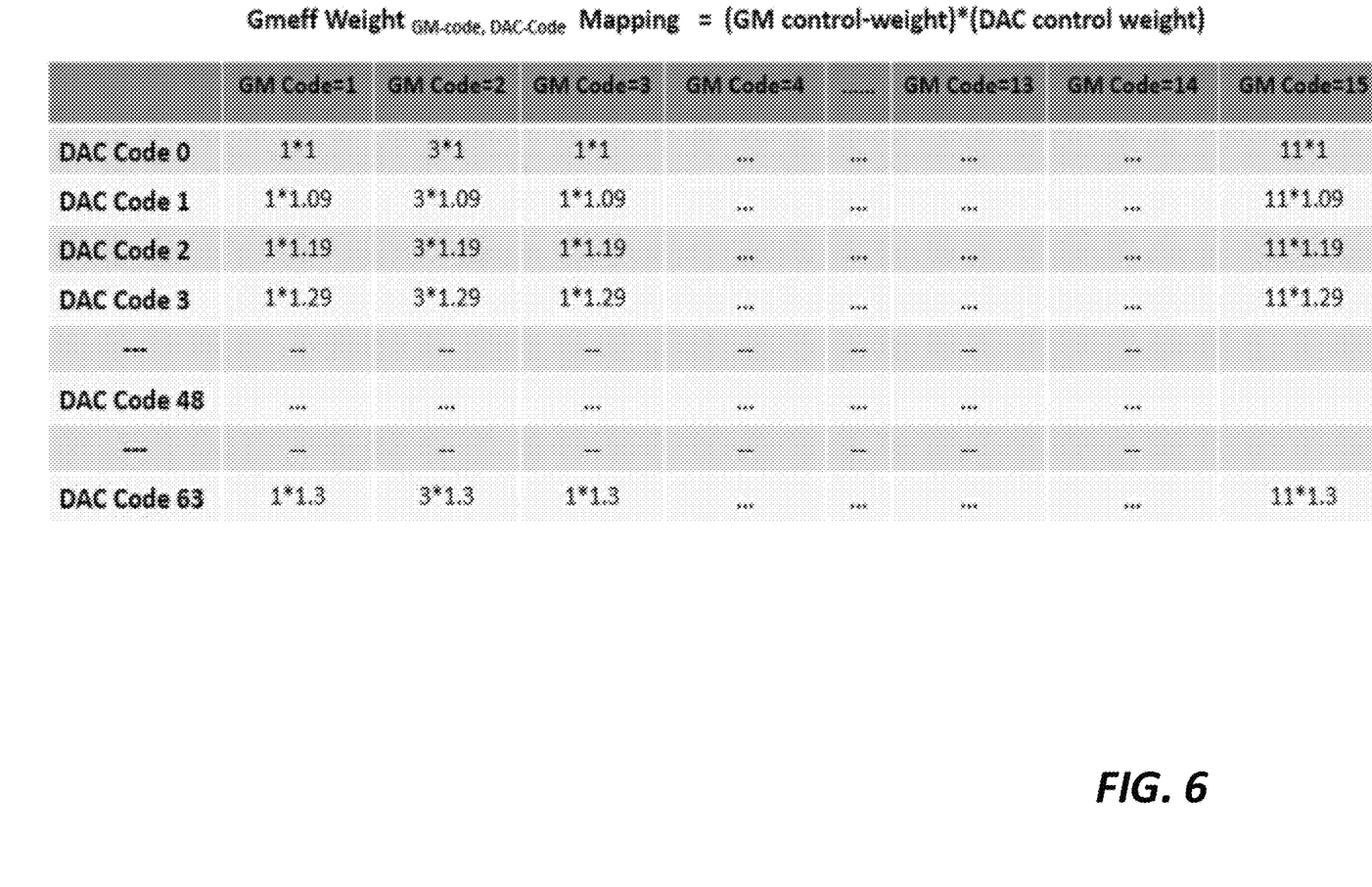
FIG. 6 is a transconductance mapping table in accordance with implementations of the subject matter of this disclosure.

More specifically, digital state machine 106 is associated with a GM-weight mapping table 108. As shown in FIG. 6, GM-weight mapping table 108 follows many-to-one mapping from its indices (coarse and fine control) to its function values (gm_eff). That is, multiple combinations of coarse control (GM Code) and fine control (DAC Code) yields to the same gm_eff values. As discussed above, an Element Control Word (ECW) which defines a unique combination of analog filter elements can be associated to a nominal analog weight which is proportional to filter's bandwidth.

In an example embodiment, the programmable analog filter is a transconductance-C filter. Transconductance (Gm) is an expression of the performance of a bipolar transistor or field-effect transistor. A Gm-C analog filter's (such as the programmable analog filter 102) bandwidth is proportional to its effective equivalent transconductance (gm_eff) but inversely proportional to the integrating capacitor—which can be represented by Equation (2) below:

$$\text{Filter's Bandwidth} \propto gm\_eff/C \qquad (2)$$

In terms of filter's elements, transconductance (gm_eff) can be expressed as a combination of discrete weights (plurality of unit elements) and fine-weights (e.g., Current Mode DAC 302 providing fine control by managing the bias current applied to the programmable analog filter 102). For example, as shown in FIG. 3, multiple of transconductor elements (GM) of varying fingered transistors are connected in parallel, forming a coarse control weight corresponding to total number of fingers. An example GM-control mapping is shown in the table (1) below:

| GM-Code [3:0] | GM-Control-Weight = Total No. of Fingers |
| --- | --- |
| 0001 | 1 |
| 0011 | 3 |
| 0111 | 6 |
| 1111 | 11 |

Furthermore, bias current of the entire GM cell is varied with a fine resolution DAC (e.g., Current Mode DAC 302), where DAC control weight captures the relationship between nominal transconductance and DAC-codes.

$$\text{Transconductance-weight} = gm\_eff = (GM\ \text{control-weight}) * (DAC\ \text{control weight}) \qquad (3)$$

Figure 4:
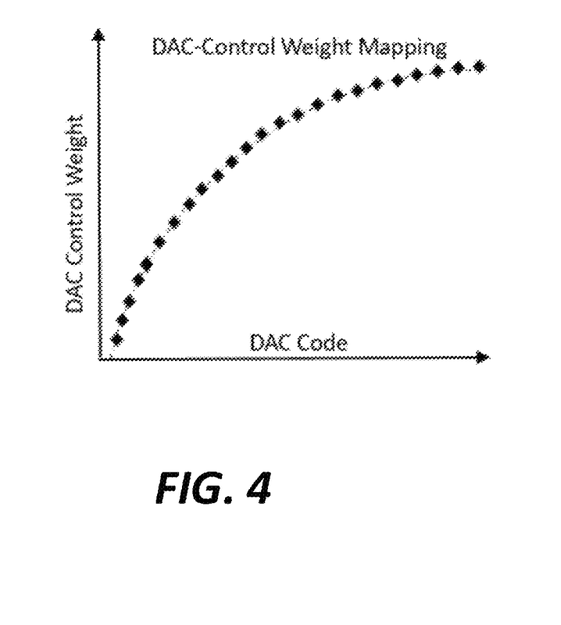
FIG. 4 is a diagram showing the graphical relationship between a DAC code and DAC Control Weight.

FIG. 4 shows a graphical relationship between a DAC code and DAC Control Weight. Based on Equation (3), a map of the filter's control is generated that has one-to-one correspondence between individual controls of ECW (GM control, DAC control, etc.) to a weight associated with that transconductance. An example of gm_eff mapping table is illustrated in FIG. 6 This weight table is pre-computed based on plurality of GM element control and DAC'S nominal characteristic curve using Equation (3) above.

Typically, gm_eff-DAC characteristic curve (as shown in FIG. 4) would have variations over temperature that are not captured in the mapping table. However, in accordance with embodiments disclosed herein, only ratios of the respective weights are critical for the accuracy of bandwidth calibration. Absolute weights (that vary widely with temperature) are not significant as long as ratio-map of the weight remains stable across temperatures. Since a current-mode DAC is used for the control of GM cells where ratio of bias currents is deterministic across DAC code, and also since transconductors are in fairly linear region of operation, the normalized ratio of DAC control weight does not vary significantly with process and temperature when measured across DAC codes.

Returning to FIG. 1, the system architecture further includes an analog control multiplexer (MUX) 110 which multiplexes the ECW controls between the ultra-fast computational engine and the full calibration using the replica cell 105. In accordance with an embodiment, the MUX 110 also aligns updates to the analog filter with its operational region (data or servo). That is, the programmable analog filter is updated dynamically with corresponding control word as the filter transitions between data and servo (or between different sectors during a read operation or different servo zones during a write operation).

Embodiments in accordance with the above architecture detail an ultra-fast bandwidth calibration scheme for analog filters. This system architecture minimizes the latency between dialing a new frequency (servo or data trigger) and setting the read channel to appropriate bandwidth. System application of this scheme enables fast zone-servo as well as ultra-fast readout for data for disk drive technologies.

As shown in FIG. 1, the background master calibration loop consists of the replica cell 105 whose time constant needs to be estimated and set to near the analog filter 102's bandwidth. The digital state machine 106 consists of a weight-mapping table 108 which resides either in hardware or firmware, in accordance with various embodiments of this disclosure. The mapping table 108 consists of effective weight of analog components (gm_eff) as indexed by filter's discrete control ECW (both coarse and fine control). Digital state machine 106 also includes a controller that performs pre-defined sequential operations/algorithm to fast compute the bandwidth calibration solution following the frequency trigger.

Figure 7:
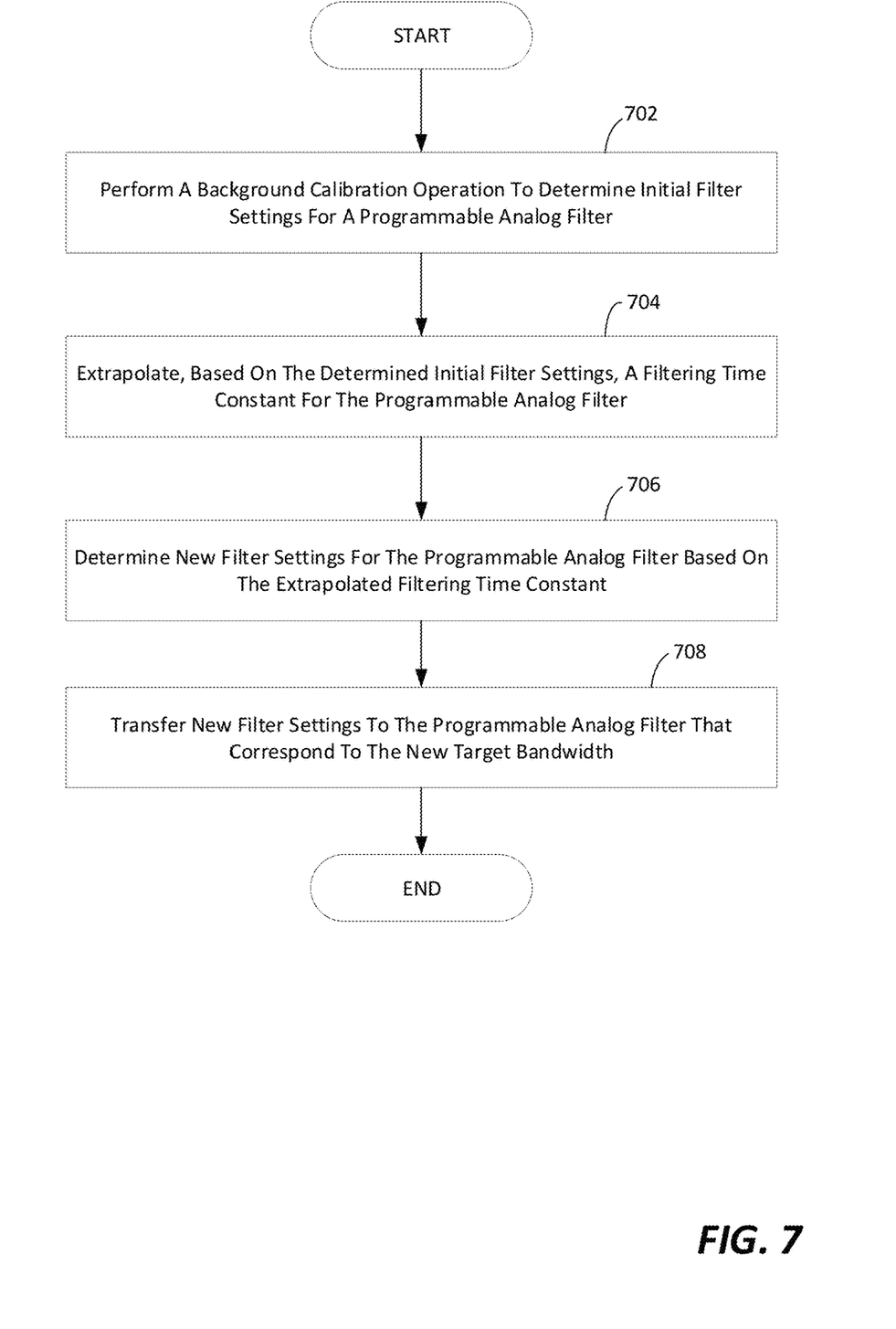
FIG. 7 is a flow diagram showing a method for improved seek times during operation of a disk drive in accordance with implementations of the subject matter of this disclosure.

The operation of the system architecture of FIG. 1 is now described with more particularity in combination with the flow diagram of FIG. 7. At 702, a background calibration operation is performed to determine initial filter settings for a programmable analog filter.

Specifically, following the first frequency trigger after power-on, the background calibration engine (using replica cell 105) begins operation. This background calibration finds an appropriate Element Control Word (ECW) (coarse and fine control of filter) corresponding to the bandwidth target. Bandwidth target is expressed as multiplication of Frequency Control Word (FCW) and the dialed data or servo mode PLL frequency.

$$\text{Bandwidth Target} = FCW * PLL\_Frequency\_Word \qquad (4)$$

As background calibration ends, the flow diagram proceeds to 704, where a proportionality constant for the programmable analog filter is extrapolated based on the determined initial filter settings. Specifically, Element Control Word corresponding to the calibrated filter along with the filter's weight control table is used to compute a normalized gm_eff that corresponded to that calibration solution. In accordance with an embodiment, this process is a lookup operation carried out on the hardware table that is indexed through ECW obtained at 702.

Once the normalized $gm_{eff}$ is computed for a given bandwidth target, the proportionality constant for the filter is computed using the following equations:

$$\text{Filter bandwidth} \propto gm\_eff/Capacitor\_weight \quad (5)$$

$$\text{Filter bandwidth} = K\_eff * gm\_eff/Capacitor\_weight \quad (6)$$

$$\text{Filtering Time Constant } (K\_eff) = \text{Filter bandwidth} * Capacitor\_weight/gm\_eff \quad (7)$$

This proportionality constant K_eff depends on analog characteristics of the filter and varies over parts and can even drift over temperature and/or voltage. In accordance with an embodiment of the current disclosure, estimation of this proportionality constant K_eff through a background calibration using the replica cell 105 tracks these drifts and variations.

Steps 702 and 704 are performed prior to receiving a newly dialed target frequency (e.g., receiving a new frequency target trigger when shifting between data and servo wedges in a disk drive application). In accordance with an embodiment, once the analog filter's proportionality constant has been determined after the initial power-on, steps 702 and 704 are performed in parallel. Once a new frequency trigger is received, the process proceeds to 706, where new filter settings for the programmable analog filter are determined based on the extrapolated proportionality constant. Specifically, first, the new target bandwidth for the analog filter 102 is computed based on the newly dialed PLL frequency and the newly dialed frequency control word:

$$\text{New Bandwidth Target} = FCW\_new * PLL\_Frequency\_new \quad (8)$$

Based on the previously determined filter's proportionality constant (K_eff at 704), newly dialed filter's bandwidth target (from Equation 8) and newly adjusted Capacitance weight (firmware dialed), the new gm_eff needed to achieve the bandwidth target is computed based on Equation 6 above.

Once the computed new gm_eff is available, the digital state machine 106 accesses the GM-weight table 108 to determine the filter's coarse and fine tuning control (FCW) by choosing values from the weight matrix which are closest to the computed new gm_eff. More specifically, digital state machine 106 accesses the GM-weight table 108 to determine the appropriate GM code (coarse control) and the DAC code (fine control) that correspond to the computed new gm_eff.

As shown in FIG. 6, the filter 102's Gm-weight table 108 follows many-to-one mapping from its indices (coarse and fine control) to its function values (gm_eff). That is, multiple combinations of coarse and fine control yields to the same gm_eff values. In one such embodiment, a rule-based lookup process is used to index FCW. For example, a higher fine control is preferred if two set of controls map to same gm_eff, in accordance with one embodiment of the current disclosure.

Moreover, the new gm_eff computed above is normalized to the filter's weight table. Hence, these are based on a correspondence and equivalence relation established between Filter's control Word (FCW) and the filter's bandwidth (established through background calibration) along with pre-determined weight-ratio table. In reality, transconductance of the filter components vary widely with temperature and/or voltage drifts. However, this variation impacts all the weights proportionally while keeping the ratio of weights intransient. Because this common variation is captured as a proportionality constant which is estimated in background (through replica cell 105) and is updated periodically, the absolute weight of the gm_eff mapping table does not matter.

In accordance with an embodiment, searching and indexing of the gm_eff lookup table 108 is implemented as rule-based search or a parallel comparison of a target gm_eff to the cells of the table. With each of these implementations, step 706 is completed within a few cycles of available clock (10¬40 cycles of reference clock). In the current implementation, fast solution to filter's bandwidth calibration is therefore available in as short a time as ~1 μs.

Once a fast solution to the filter's bandwidth calibration is available, the process proceeds to step 708 and the filter settings are immediately applied to the channel as the channel switches between Data/Servo. More particularly, the appropriate GM code (coarse control) and the DAC code (fine control) that correspond to the computed new gm_eff are transmitted to the programmable analog filter 102. For example, based on the transmitted GM code, a number of transconductor elements of varying-fingered transistors could be connected in parallel, thus forming a coarse control weight corresponding to the total number of fingers. Similarly, based on the transmitted DAC code, bias current of the entire transconductor cell is varied using the Current Mode DAC 302.

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A disk drive comprising:
   a disk having a disk surface, wherein:
      the disk surface includes a plurality of tracks arranged in an embedded servo format including a plurality of user-data regions and a plurality of servo data regions;
      each data region includes a plurality of data zones in each of which user data is stored in a plurality of track segments at a data channel frequency particular to that data zone; and
      each servo region includes a plurality of servo zones in each of which servo data are stored in a plurality of track segments at a servo channel frequency particular to that servo zone and different from the data channel frequency;
   a read channel for performing a user-data read operation for reading data from the disk surface, wherein the read channel comprises:
      a digital processor configured to:
         extrapolate, based on initial filter settings corresponding to a first user-data region or a first servo-data region and tracked settings varying over time, a proportionality constant for a programmable analog filter;
         in response to determining a new target frequency for the programmable analog filter corresponding to a second user-data region or a second servo-data region, compute new filter settings for the programmable analog filter based on the extrapolated proportionality constant; and
         transmit, to the programmable analog filter, the computed new filter settings corresponding to the new target frequency of the second user-data region or the second servo-data region.

2. The disk drive of claim 1, wherein the digital processor is configured to extrapolate the proportionality constant for the programmable analog filter by:
performing a background calibration operation to determine the initial filter settings for the programmable analog filter corresponding to the first user-data region or the first servo-data region; and
determining a ratio between a transconductance value generated based on the determined initial filter settings and initial target bandwidth corresponding to the first user-data region or the first servo-data region, wherein the ratio is constant over temperature and voltage variance.

3. The disk drive of claim 2, wherein the digital processor is configured to extrapolate the proportionality constant for the programmable analog filter by:
determining an element control word corresponding to the initial target bandwidth corresponding to the first user-data region or the first servo-data region;
computing an initial transconductance value corresponding to the determined element control word; and
estimating the proportionality constant based on the computed initial transconductance value.

4. The disk drive of claim 3, wherein the digital processor is configured to compute the initial transconductance value by:
searching a weight-lookup table to identify an initial fine-tuning control value and an initial coarse control value corresponding to the determined element control word.

5. The disk drive of claim 1, wherein the digital processor is configured to compute new filter settings for the programmable analog filter based on the extrapolated proportionality constant by:
computing a desired bandwidth based on a new target phase-locked loop frequency and a new frequency control word corresponding to the second user-data region or the second servo-data region;
computing a new normalized transconductance value based on the computed proportionality constant and the computed desired bandwidth; and
determining the new filter settings for the programmable analog filter based on the computed new transconductance value.

6. The disk drive of claim 5, wherein the desired bandwidth is computed in accordance with:

Desired Bandwidth=FCW_new*PLL_Frequency_new;

wherein FCW_new is the new frequency control word and PLL_Frequency_new is the new target phase-locked loop frequency.

7. The disk drive of claim 5, wherein the digital processor is configured to determine the new filter settings for the programmable analog filter by:
searching a weight-lookup table to identify the new filter settings corresponding to the computed new transconductance value, wherein the filter settings include a fine-tuning control value and a coarse control value.

8. The disk drive of claim 7, wherein the weight-lookup table is pre-computed based on a nominal characteristic curve of a plurality of transconductor elements and Digital-to-Analog Converter (DAC) codes.

9. The disk drive of claim 7, wherein the fine-tuning control value corresponds to a biasing voltage applied to the programmable analog filter.

10. The disk drive of claim 7, wherein the coarse control value corresponds to a number of unit elements connected in parallel within the programmable analog filter.

11. A method for improving seek times in a read channel performing a read operation on a disk drive, the disk drive comprising a disk having a disk surface, wherein:
the disk surface includes a plurality of tracks arranged in an embedded servo format including a plurality of user-data regions and a plurality of servo data regions;
each data region includes a plurality of data zones in each of which user data is stored in a plurality of track segments at a data channel frequency particular to that data zone; and
each servo region includes a plurality of servo zones in each of which servo data are stored in a plurality of track segments at a servo channel frequency particular to that servo zone and different from the data channel frequency;
the method comprising:
extrapolating, based on initial filter settings corresponding to a first user-data region or a first servo-data region and tracked settings varying over time, a proportionality constant for a programmable analog filter;
in response to determining a new target frequency for the programmable analog filter corresponding to a second user-data region or a second servo-data region, computing new filter settings for the programmable analog filter based on the extrapolated proportionality constant; and
transmitting, to the programmable analog filter, the computed new filter settings corresponding to the new target frequency of the second user-data region or the second servo-data region.

12. The method of claim 11, wherein the proportionality constant for the programmable analog filter is extrapolated by:
performing a background calibration operation to determine the initial filter settings for the programmable analog filter corresponding to the first user-data region or the first servo-data region; and
determining a ratio between a transconductance value generated based on the determined initial filter settings and initial target bandwidth corresponding to the first user-data region or the first servo-data region, wherein the ratio is constant over temperature and voltage variance.

13. The method of claim 12, wherein the proportionality constant for the programmable analog filter is extrapolated by:
determining an element control word corresponding to the initial target bandwidth corresponding to the first user-data region or the first servo-data region;
computing an initial transconductance value corresponding to the determined element control word; and
estimating the proportionality constant based on the computed initial transconductance value.

14. The method of claim 13, wherein the initial transconductance value is computed by:
searching a weight-lookup table to identify an initial fine-tuning control value and an initial coarse control value corresponding to the determined element control word.

15. The method of claim 11, wherein the new filter settings for the programmable analog filter is computed based on the extrapolated proportionality constant by:
- computing a desired bandwidth based on a new target phase-locked loop frequency and a new frequency control word corresponding to the second user-data region or the second servo-data region;
- computing a new normalized transconductance value based on the computed proportionality constant and the computed desired bandwidth; and
- determining the new filter settings for the programmable analog filter based on the computed new transconductance value.

16. The method of claim 15, wherein the desired bandwidth is computed in accordance with:

Desired Bandwidth=FCW_new*PLL_Frequency_new;

wherein FCW_new is the new frequency control word and PLL_Frequency_new is the new target phase-locked loop frequency.

17. The method of claim 15, wherein the new filter settings for the programmable analog filter is determined by:
- searching a weight-lookup table to identify the new filter settings corresponding to the computed new transconductance value, wherein the filter settings include a fine-tuning control value and a coarse control value.

18. The method of claim 17, wherein the weight-lookup table is pre-computed based on a nominal characteristic curve of a plurality of transconductor elements and Digital-to-Analog Converter (DAC) codes.

19. The method of claim 17, wherein the fine-tuning control value corresponds to a biasing voltage applied to the programmable analog filter.

20. The method of claim 17, wherein the coarse control value corresponds to a number of unit elements connected in parallel within the programmable analog filter.

* * * * *